(No Model.)
S. GANTZ.
DUMPING CART.
No. 405,770. Patented June 25, 1889.
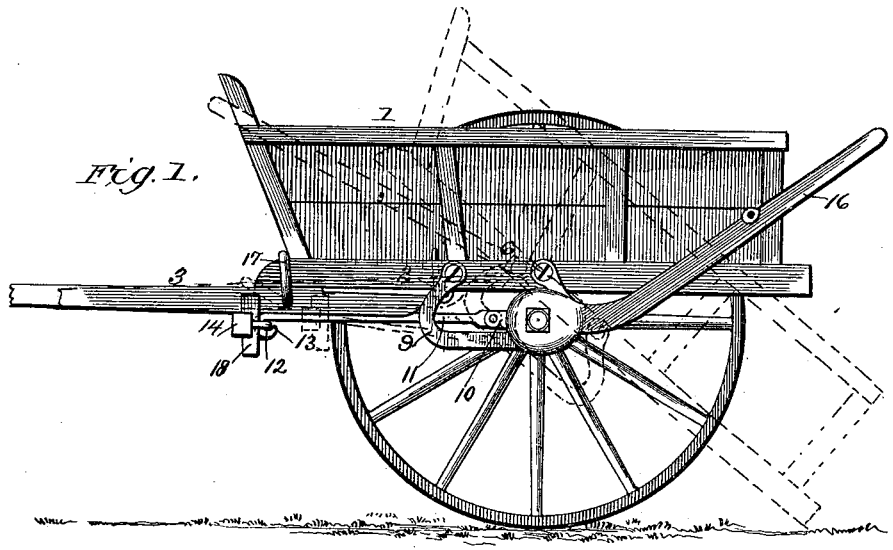
WITNESSES:
Fred G. Dieterich
Jos. A. Ryan
INVENTOR
Samuel Gantz
BY
ATTORNEY

UNITED STATES PATENT OFFICE.

SAMUEL GANTZ, OF HAGERSTOWN, MARYLAND.

DUMPING-CART.

SPECIFICATION forming part of Letters Patent No. 405,770, dated June 25, 1889.

Application filed April 15, 1889. Serial No. 307,377. (No model.)

*To all whom it may concern:*

Be it known that I, SAMUEL GANTZ, of Hagerstown, in the county of Washington and State of Maryland, have invented a new and useful Improvement in Dumping-Carts, of which the following is a specification.

My invention consists in a new and improved dumping-cart, which will be hereinafter fully described and claimed.

Referring to the accompanying drawings, Figure 1 is a side view of my new and improved dumping-cart, showing in dotted lines the cart dumped. Fig. 2 is a top plan view, partly in section, and Fig. 3 is a side view showing the cart going downhill.

The same numerals of reference indicate corresponding parts in all the figures.

Referring to the several parts by their designating numerals, 1 indicates the body of a cart, which is hinged at 2 2 to the rear ends of the shafts 3 3.

4 indicates the axle, round in cross-section. This axle has metal collars 5 5 loosely mounted on it near each end, and the cart-body is supported on these collars, the lower side bars 6 of the cart-body resting on the collars.

The collars 5 have annular flanges 7 on their inner ends, which hold the collars from lateral movement on the axle, while to the outer side of the bars 8 are secured the downwardly-extending stirrups 9 9, which hold the cart from rising from the axle. The outer ends of the collars 5 bear against the inner side of the stirrups 9.

The axle 4 has parallel crank-arms 10 10, as shown, between which are pivoted the flattened rear ends of connecting-rods 11 11, the front ends of which are formed with eyes 12, which are hinged in staples 13 13 on the rear side of the lower cross-bar 14 of the shafts. To one end of the axle 4, which may be squared at that point, between the wheel 15 and the stirrup 9 on that side, is secured the inner end of a lever 16. The connecting-rods 11 are of such length that when the rods are in a straight line with the crank-arms 10 the axle will be at the center of the cart-body, when the lever 16 will be depressed back at the side of the cart-body, in which lowered position it may be secured by any suitable catch or device, if desired, to hold it when the cart is being backed.

To dump the cart, the hinged bail 17 is first turned down on the shafts clear of the front ends of side bars 6, when the lever is raised and pushed forward. As the axle is thus turned by the lever, the crank-arms 10 turn down and under the axle, when the hinged rods 11 will serve to draw, slide, the cart-body backward on the axle, the body moving with the revolving collars 5 5, on which it rests, and which thus reduce friction. The cart-body is thus slid back until its center is back of the axle, when the weight of the load in the cart will cause it to dump, as shown in Fig. 1. The movement of the cart-body and of the lever is limited by stop-plates 18 on the projecting ends of the lower cross-bar 14, with which the wheels come in contact, as shown in Fig. 1 in dotted lines.

By drawing back the lever after the cart is dumped the axle is turned to raise the crank-arms 10 up straight in line with the connecting-rods 11, when the cart-body will be slid forward over the axle until its center is over the axle.

In going downhill, when the horse holds back, the connecting-rods will turn the crank-arms of the axle down under the axle, thus automatically sliding the cart-body back on the axle, as shown in Fig. 3, thus greatly lightening the weight and strain on the horse, and at the same time bringing the wheels of the cart in contact with the blocks 18, thus automatically putting on the brakes as the cart starts downhill. As soon as level or uneven ground is reached and the horse starts to pull ahead the connecting-rods will pull out straight in line with the crank-arms, thus automatically turning the axle and sliding the cart-body forward on the axle until its center is over the axle, thus automatically removing the brakes from the wheels.

It will thus be seen that my invention will operate automatically to regulate and adjust the weight and strain of the loaded cart on the horse in going up and down hills and on even ground.

Having thus described my invention, what I claim, and desire to secure by Letters Patent, is—

1. In a dumping-cart, the combination of a cart-body hinged to the rear ends of the shafts, an axle having the crank-arms, the connecting-rods, and the lever, substantially as set forth.

2. The combination of a cart-body hinged to the rear ends of the shafts, an axle having the crank-arms, the connecting-rods, the loose collars, and the lever, substantially as set forth.

3. The combination of a cart-body hinged to the rear ends of the shafts, an axle having the crank-arms, the connecting-rods, the stirrups, and the lever, substantially as set forth.

4. The combination of a cart-body hinged to the rear ends of the shafts and having the stirrups, an axle having the crank-arms, the loose collars, the connecting-rods, and the lever, substantially as set forth.

5. The combination of a cart-body hinged to the rear ends of the shafts and having the stirrups, an axle having the crank-arms, the connecting-rods, the loose collars, the lever, and the cross-bar having the stop-plates at its projecting ends, substantially as set forth.

SAMUEL GANTZ.

Witnesses:
SOLON C. KEMON,
J. F. REILY.